United States Patent
Namgung

(10) Patent No.: US 7,637,348 B2
(45) Date of Patent: Dec. 29, 2009

(54) ELECTRIC POWER STEERING APPARATUS EQUIPPED WITH TENSION ADJUSTING MECHANISM

(75) Inventor: Joo Namgung, Wonju-si (KR)

(73) Assignee: Mando Corporation, Pyeongtaek-si (KR)

( * ) Notice: Subject to any disclaimer, the term of this patent is extended or adjusted under 35 U.S.C. 154(b) by 124 days.

(21) Appl. No.: 11/880,238

(22) Filed: Jul. 20, 2007

(65) Prior Publication Data

US 2008/0035415 A1 Feb. 14, 2008

(30) Foreign Application Priority Data

Aug. 10, 2006 (KR) ...................... 10-2006-0075361

(51) Int. Cl.
*B62D 5/04* (2006.01)
(52) U.S. Cl. ....................... 180/444; 180/446; 180/443; 180/402
(58) Field of Classification Search ................ 180/444, 180/446, 402, 443
See application file for complete search history.

(56) References Cited

U.S. PATENT DOCUMENTS

| | | | |
|---|---|---|---|
| 5,465,210 A | | 11/1995 | Walenty |
| 7,360,624 B2* | | 4/2008 | Nagamatsu ................. 180/444 |
| 7,490,696 B2* | | 2/2009 | Saruwatari et al. .......... 180/444 |
| 2003/0107200 A1* | | 6/2003 | Huang et al. ........... 280/93.515 |
| 2004/0043854 A1* | | 3/2004 | Fraley et al. ................ 474/134 |
| 2005/0079939 A1 | | 4/2005 | Simmons |
| 2005/0121251 A1* | | 6/2005 | Ueno et al. .................. 180/444 |
| 2005/0133297 A1* | | 6/2005 | Chikaraishi ................. 180/444 |
| 2005/0247514 A1 | | 11/2005 | Heitzer |
| 2006/0076181 A1* | | 4/2006 | Murakami et al. .......... 180/443 |
| 2006/0156839 A1* | | 7/2006 | Ueno et al. .............. 74/388 PS |
| 2006/0183583 A1* | | 8/2006 | Sakaida et al. ................. 474/70 |
| 2007/0095600 A1* | | 5/2007 | Jo et al. ....................... 180/444 |

FOREIGN PATENT DOCUMENTS

| | | |
|---|---|---|
| DE | 10103404 A1 | 8/2002 |
| DE | 102004028855 A1 | 1/2005 |
| DE | 102004012377 A1 | 9/2005 |
| EP | 0982564 A1 | 3/2000 |
| EP | 1283148 A2 | 2/2003 |

(Continued)

OTHER PUBLICATIONS

European Search Report for Application No. 07013660.1-2425, dated Sep. 28, 2007.

(Continued)

*Primary Examiner*—Lesley D Morris
*Assistant Examiner*—Marlon A Arce
(74) *Attorney, Agent, or Firm*—Lahive & Cockfield, LLP; EuiHoon Lee, Esq.

(57) ABSTRACT

An electric power steering apparatus includes: a motor for providing assistant steering power; a following pulley connected with the motor through a belt to receive a driving force; a gear housing surrounding the following pulley; a motor housing rotatably assembled with the gear housing; and a tension adjusting mechanism for adjusting a rotation angle of the motor housing so as to adjust a tension of the belt. Therefore, the relative rotation angle of the motor housing respective to the gear housing can be adjusted so that the tension of the belt can be easily controlled and the generation of vibration and noise of the belt can be prevented.

7 Claims, 5 Drawing Sheets

FOREIGN PATENT DOCUMENTS

| | | |
|---|---|---|
| EP | 1318061 A2 | 6/2003 |
| EP | 1503172 A2 | 2/2005 |
| EP | 1792804 A1 | 6/2007 |
| JP | 2005-349862 | 12/2005 |
| JP | 2006-27577 | 2/2006 |

OTHER PUBLICATIONS

European Search Report for Application No. 06025655.9-1523, dated Nov. 7, 2007.

* cited by examiner

ELECTRIC POWER STEERING APPARATUS EQUIPPED WITH TENSION ADJUSTING MECHANISM

RELATED APPLICATIONS

This application claims priority to Korean patent application No. KR2006-75631 filed on Aug. 10, 2006, the content of which is incorporated by reference.

FIELD OF THE INVENTION

The present invention relates to an electric power steering apparatus, and more particularly to an electric power steering apparatus equipped with a tension adjusting mechanism which can adjust a rotation angle of a motor housing capable of relatively rotating respective to a gear housing, so as to adjust tension of a belt.

BACKGROUND OF THE INVENTION

Generally, hydraulic power steering apparatuses have been used as power steering apparatuses for vehicles. Since the 1990's, electric power steering apparatuses using a motor have been popularized.

In a conventional hydraulic steering apparatus, a hydraulic pump, which is a power source providing assistant steering power, is operated by an engine, and always consumes energy regardless of the rotation of a steering wheel. On the other hand, in an electric power steering apparatus, if torque is generated by rotation of a steering wheel, a motor provides assistant steering power proportionate to the generated steering torque. Therefore, when the electric power steering apparatus is used, it is possible to improve energy efficiency in comparison with the hydraulic power steering apparatus.

FIG. 1 is a block diagram of an electric power steering apparatus according to the conventional art.

As shown in FIG. 1, in general, an electric power steering apparatus includes a steering system 100 extending from a steering wheel 101 to each wheel 108 on both sides of the vehicle, and an assistant power mechanism 120 providing assistant steering power to the steering system.

The steering system 100 has an upper part connected to the steering wheel 101 to rotate along the steering wheel 101, and a lower part connected to a pinion shaft 104 by a pair of universal joints 103. Further, the pinion shaft 104 is connected to a rack bar 109 through a rack-pinion mechanism 105, while both ends of the rack bar 109 are connected to both wheels 108 of the vehicle by tie rods 106 and knuckle arms 107, respectively.

The rack-pinion mechanism 105 includes a pinion gear 111 formed on a lower part of the pinion shaft 104, and a rack gear 112 formed on a peripheral surface of one end of the rack bar 109 and engaged with the pinion gear 111. The rotational movement of the pinion shaft 104 is changed to a linear movement of the rack bar 109 through the rack-pinion mechanism 105.

Therefore, when a driver operates the steering wheel 101, the pinion shaft 104 rotates, the rack bar 109 straightly moves along the axial direction thereof depending on the rotation of the pinion shaft 104, and the linear movement of the rack bar 109 causes the tie rods 106 and knuckle arms 107 to steer the wheels 108.

The assistant power mechanism 120 includes a torque sensor 121 for sensing steering torque applied to the steering wheel 101 by the driver and outputting an electric signal in proportion to the sensed steering torque and an electronic control unit 123 for generating a control signal depending on the electric signal transmitted from the torque sensor 121. The assistant power mechanism 120 also includes a motor 130 for generating assistant steering power according to the control signal transmitted from the electronic control unit 123, and a belt-type power transmission apparatus 140 for transferring the assistant power generated by the motor 130 to the rack bar 109 through the belt.

Accordingly, in the electric power steering apparatus, the steering torque generated by the rotation of the steering wheel 101 is transferred through the rack-pinion mechanism 105 to the rack bar 109. The assistant steering power, which the motor 130 generates depending on the generated steering torque, is transferred by the belt-type power transmission apparatus to the rack bar 109. In other words, the torque generated in the steering system 100 and the assistant steering power generated by the motor 130 are combined with each other so as to cause the rack bar to be moved along an axis thereof.

Meanwhile, the electric power steering apparatus may have a structure that the assistant steering power generated in the motor 130 is transferred to the steering wheel 102 or the pinion shaft 104.

FIG. 2 is a sectional view illustrating the conventional electric power steering apparatus.

As shown in FIG. 2, the conventional electric power steering apparatus for the vehicle includes the rack bar 109 extending in a transverse direction of the vehicle and having the rack gear in an outer peripheral surface of an end thereof, the pinion shaft 104 having the pinion gear engaged with the rack gear. The conventional electric power steering apparatus includes a ball screw part 210 having a ball nut 205 engaged with a ball screw 203 through balls 201, the belt-type power transmission apparatus 140 connecting a ball nut 205 to the shaft 221 of the motor, and the motor 130.

The pinion shaft 104 is connected to the steering wheel through the steering shaft, and the rack bar 109 having the screw formed by a predetermined length at one end thereof is contained in a rack housing. Furthermore, the rack housing includes the first housing 225 having the rack gear and the second housing 227 having the motor.

The belt-type electric transmission apparatus 140 includes a belt connecting the shaft 221 of the motor 221 and the ball nut 205, and transfers steering assistance power generated in the motor 130 in proportion to the steering toque applied to the steering wheel to the rack bar 109 through the ball nut 205.

However, the belt-type electric transmission apparatus 140 enables vibration and impact, etc. of the rack bar 109 not to be directly transferred to the motor 130. However, as the intension of the belt is changed due to the wear of the belt or a pulley, vibration is generated in the belt and can be transferred to the body of the vehicle, thereby causing noise.

SUMMARY OF THE INVENTION

Accordingly, the present invention has been made to solve the above-mentioned problems occurring in the prior art, and the present invention provides an electric power steering apparatus equipped with a tension adjusting mechanism which can adjust the rotation angle of a motor housing capable of relatively rotating respective to a gear housing so as to adjust the tension of a belt.

In order to accomplish an object of the present invention, there is provided an electric power steering apparatus including: a motor for providing a assistant steering power; a following pulley connected with the motor through a belt to receive a driving force; a gear housing surrounding the following pulley; a motor housing rotatably assembled with the gear housing; and a tension adjusting mechanism for adjusting a rotation angle of the motor housing so as to adjust a tension of the belt.

BRIEF DESCRIPTION OF THE DRAWINGS

The above and other objects, features and advantages of the present invention will be more apparent from the following detailed description taken in conjunction with the accompanying drawings, in which:

FIG. 3b is a sectional view of the electric power steering apparatus in the direction A-A of FIG. 3a.

DETAILED DESCRIPTION OF THE EXEMPLARY EMBODIMENTS

Figure 1:
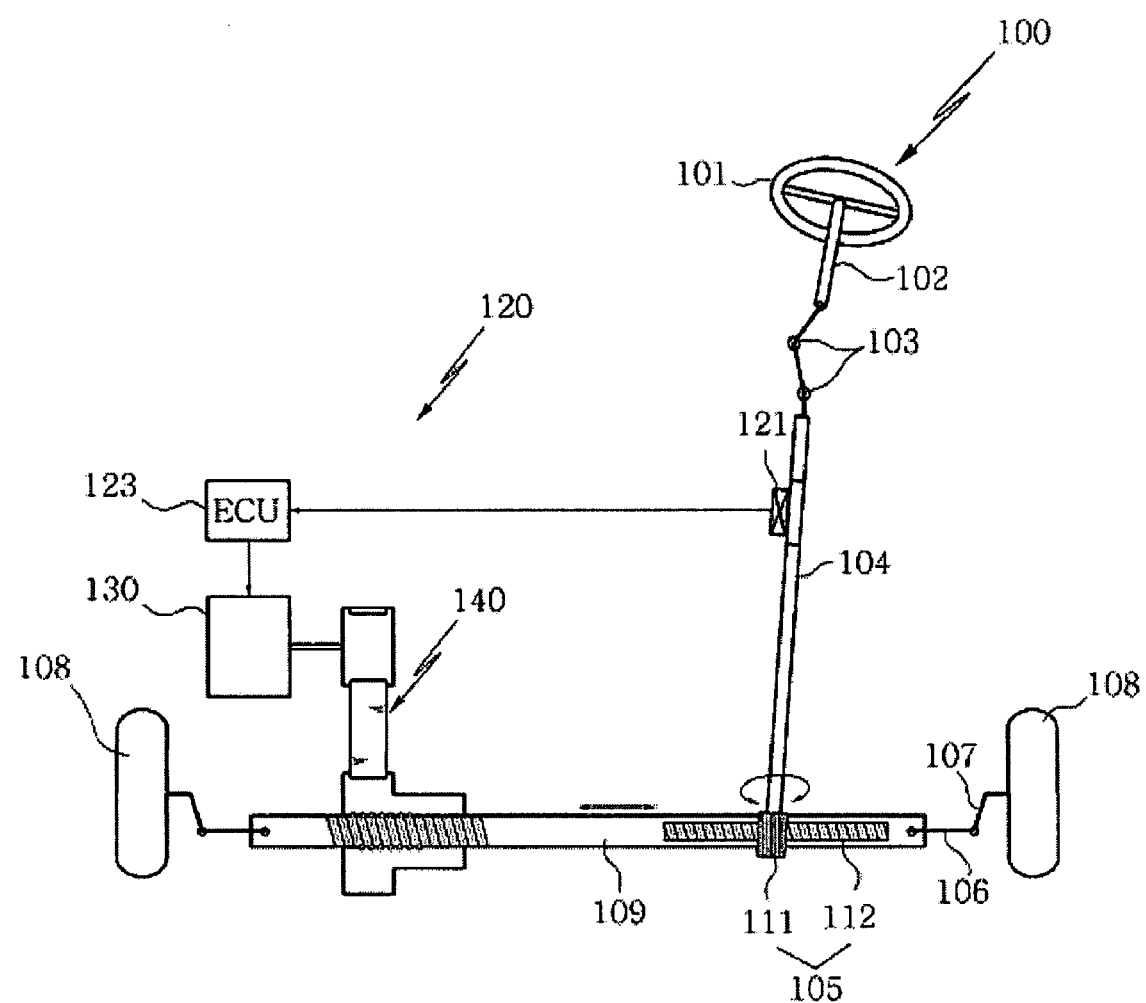
FIG. 1 is a block diagram of the conventional electric power steering apparatus.
Figure 2:
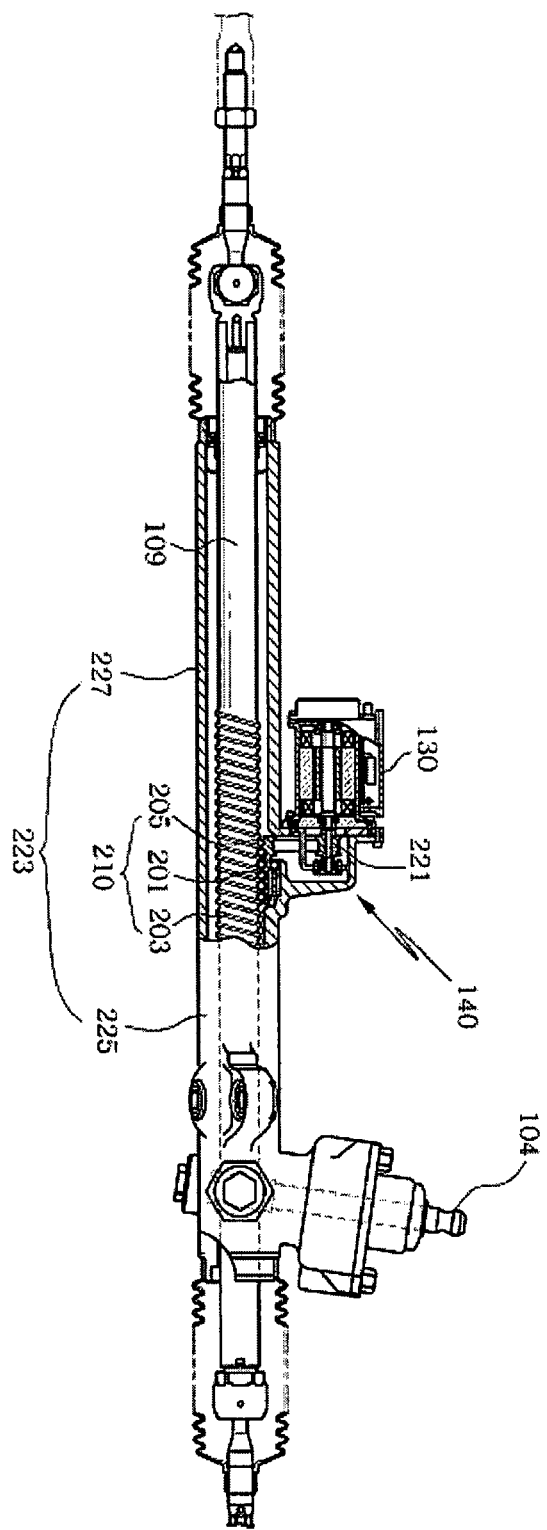
FIG. 2 is a sectional view of a part of the conventional electric power steering apparatus.

Hereinafter, an exemplary embodiment of the present invention will be described with reference to the accompanying drawings. In the following description and drawings, the same reference numerals are used to designate the same or similar components. Further, in the following description of the present invention, a detailed description of known functions and configurations incorporated herein will be omitted when it may make the subject matter of the present invention rather unclear.

Figure 3A:
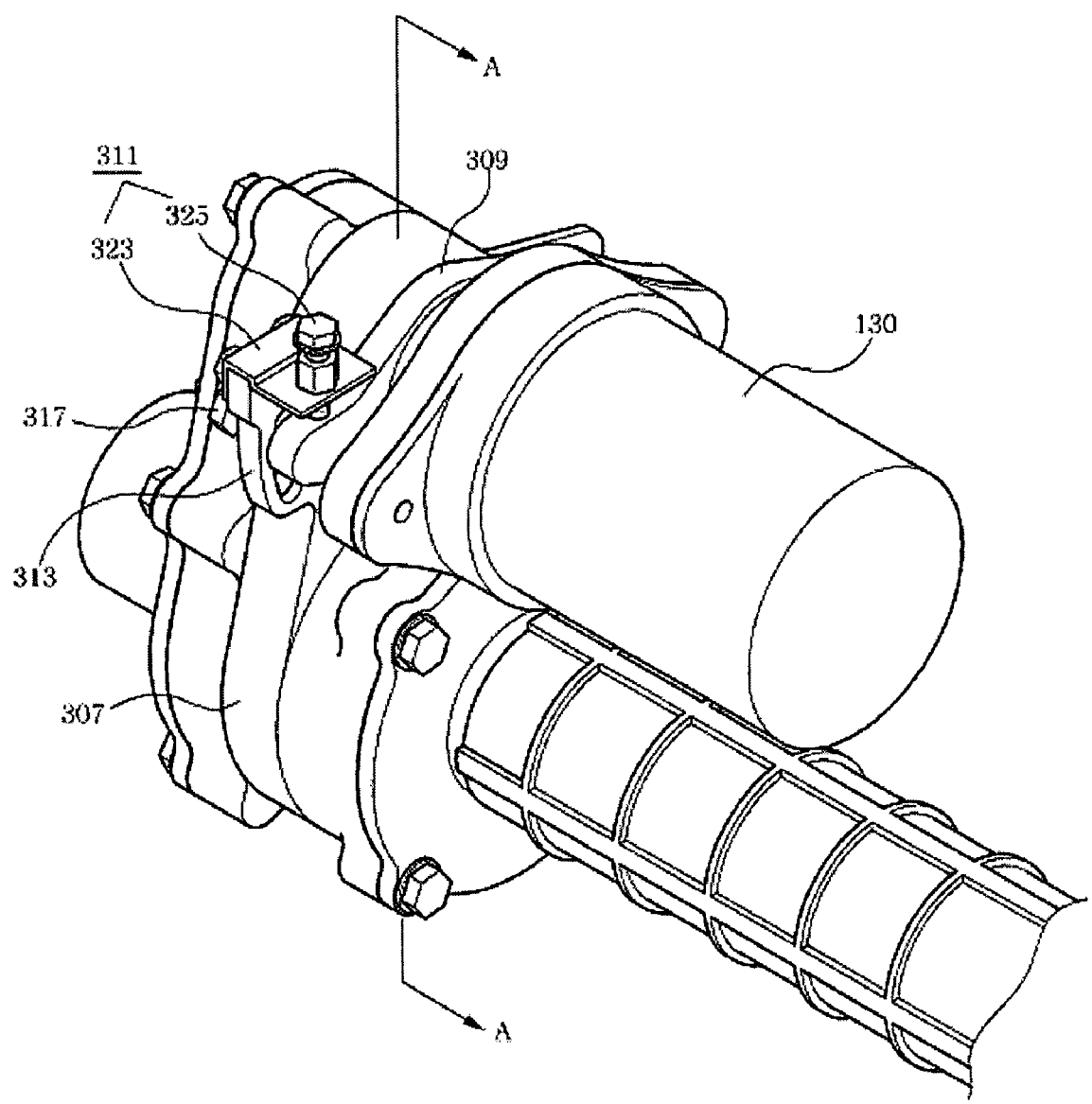
FIG. 3a is a perspective view illustrating a part of an electric power steering apparatus according to the first embodiment of the present invention.
Figure 3B:
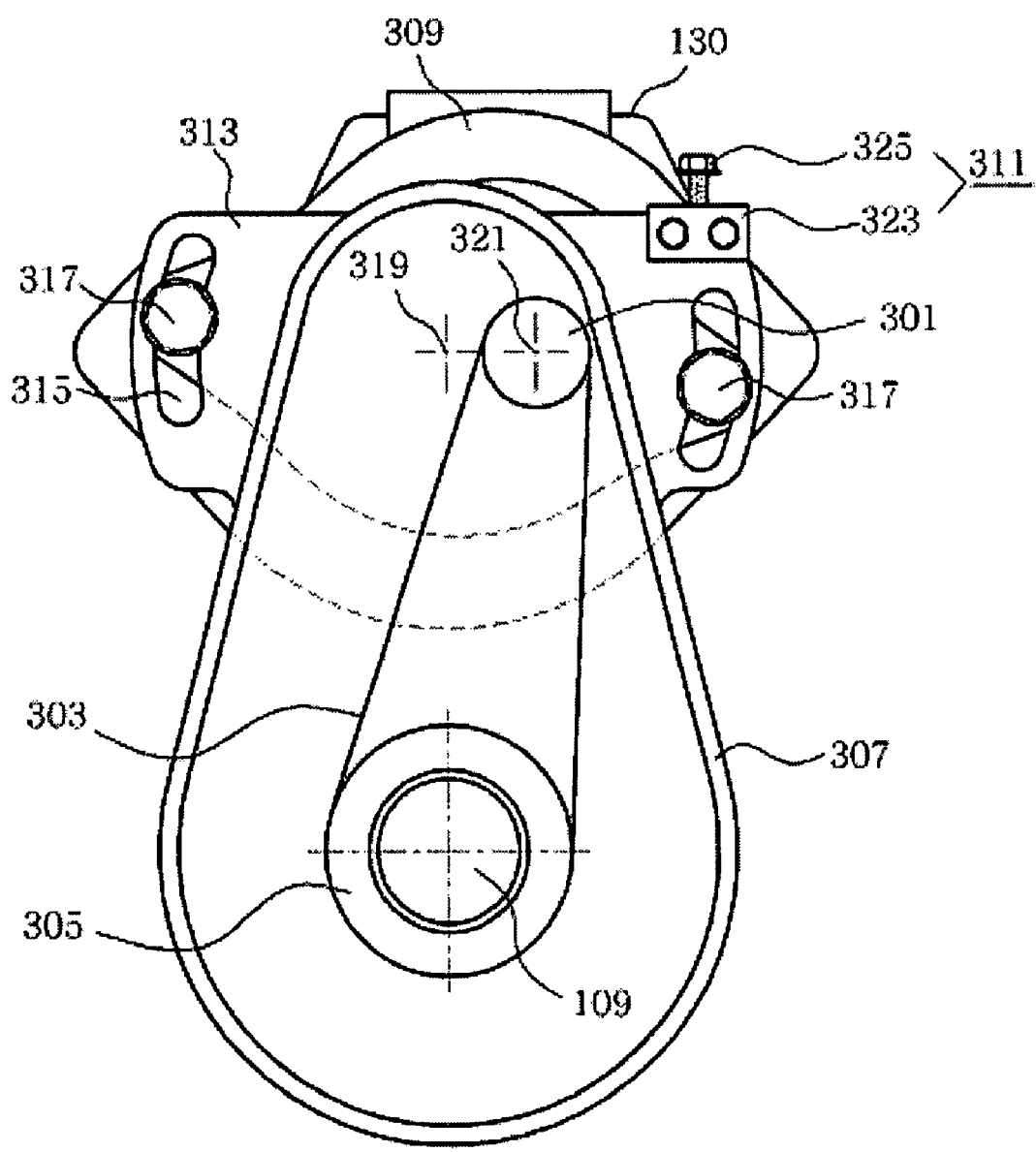

FIG. 3a is a perspective view illustrating a part of an electric power steering apparatus according to the first embodiment of the present invention, and FIG. 3b is a sectional view of the electric power steering apparatus in the direction A-A of FIG. 3a.

As shown in FIGS. 3a and 3b, the electric power steering apparatus according to the first embodiment of the present invention includes a motor 130 for providing steering assistance power, a driving pulley 301 extending from one end of the motor 130, and a following pulley 305 connected to the driving pulley 301 of the motor 130 through a belt 303 so as to receive driving force. The electric power steering apparatus also includes a gear housing 307 surrounding the driving pulley 301 and the following pulley 305, a motor housing 309 rotatably assembled with the gear housing 307, and a tension adjusting mechanism 311 for adjusting the rotation angel of the motor housing 309 so as to adjust the tension of the belt 310.

The driving pulley 301 is connected with a rotor (not shown) of the motor so as to be rotated, and the following pulley 305 is connected with the driving pulley 301 through the belt 303 so as to receive the rotational force of the motor 130. Furthermore, the following pulley 305 makes contact with the rack bar 109 through a ball screw (not shown).

The gear housing 307 surrounds the driving pulley 301 and the following pulley 305.

A coupling part 313 extends from left and right sides of an upper part of the gear housing 307, and the coupling part 313 has guide holes 315 of a circular shape. The gear housing 307 and the motor housing 309 are assembled with each other through bolts 317 extending through corresponding guide hole 315 to be inserted into the motor housing 309.

A rotor (not shown) protruding from the motor 130 extends through the motor housing 309 and is then assembled with the driving pulley 301.

Furthermore, the motor housing 309 is rotatably assembled with the gear housing 307 through the guide holes 315 and the bolts 317. The motor housing 309 rotates along the guide holes 315 having a circular shape so that the center of an imaginary circle formed by imaginary extension lines of the guide holes 315 serves as the center 319 of rotation of the motor housing 309.

The driving pulley 310 extends through a point spaced a predetermined distance from the center 319 of the rotation of the motor housing 309.

Therefore, the motor housing 309 is relatively rotated respective to the gear housing 307 so that the axial center 321 of the driving pulley 301 revolves about the center 319 of rotation of the motor housing 309.

The tension adjusting mechanism 311 is an apparatus for adjusting a relative rotation angle of the motor housing 309 respective to the gear housing 307 so as to adjust the tension of the belt 303. The tension adjusting mechanism 311 includes a supporting member 323 and an adjusting bolt 325.

The supporting member 323 is assembled with the coupling part 313 of the gear housing 307. The adjusting bolt 325 is inserted into an end of the supporting member 323 so that an end of the adjusting member 325 makes contact with a side surface of the motor housing 309. The supporting member 323 is fastened to the coupling part 313 by a coupling means such as bolt, etc., or may be configured as an integrated part of the coupling part 313.

In order to rotate the motor housing 309, the adjusting bolt 325 is rotated so as to apply a predetermined amount of power to the motor housing 309.

Particularly, when the adjusting bolt 325 is rotated, the motor housing 309 is pushed by an end of the adjusting bolt 325 so that the motor housing 309 is relatively rotated respective to the gear housing 307. As a result, the relative rotation angle can be easily adjusted. Accordingly, the tension of the belt 303 can be easily adjusted.

As shown in FIG. 3b, when the motor housing 309 is rotated in a counter clockwise direction, the driving pulley 301 rotates in a counter clockwise direction so that the distance between the driving pulley 301 and the following pulley 305 is far. Accordingly, the tension of the belt 303 becomes stronger.

Meanwhile, when the motor housing 309 is rotated in a clockwise direction, the distance between the driving pulley 301 and the following pulley 305 is closer so that the tension of the belt 303 is lessened.

On the other hand, although the bolt 317 enabling the gear housing 307 to be assembled with the motor housing 309 is disassembled, the adjusting bolt 325 fixes the location of the motor housing 309. Therefore, it is possible to prevent release of the bolt 317, which may cause loss of the tension of the belt 303, resulting in loss of the steering function.

Figure 4:
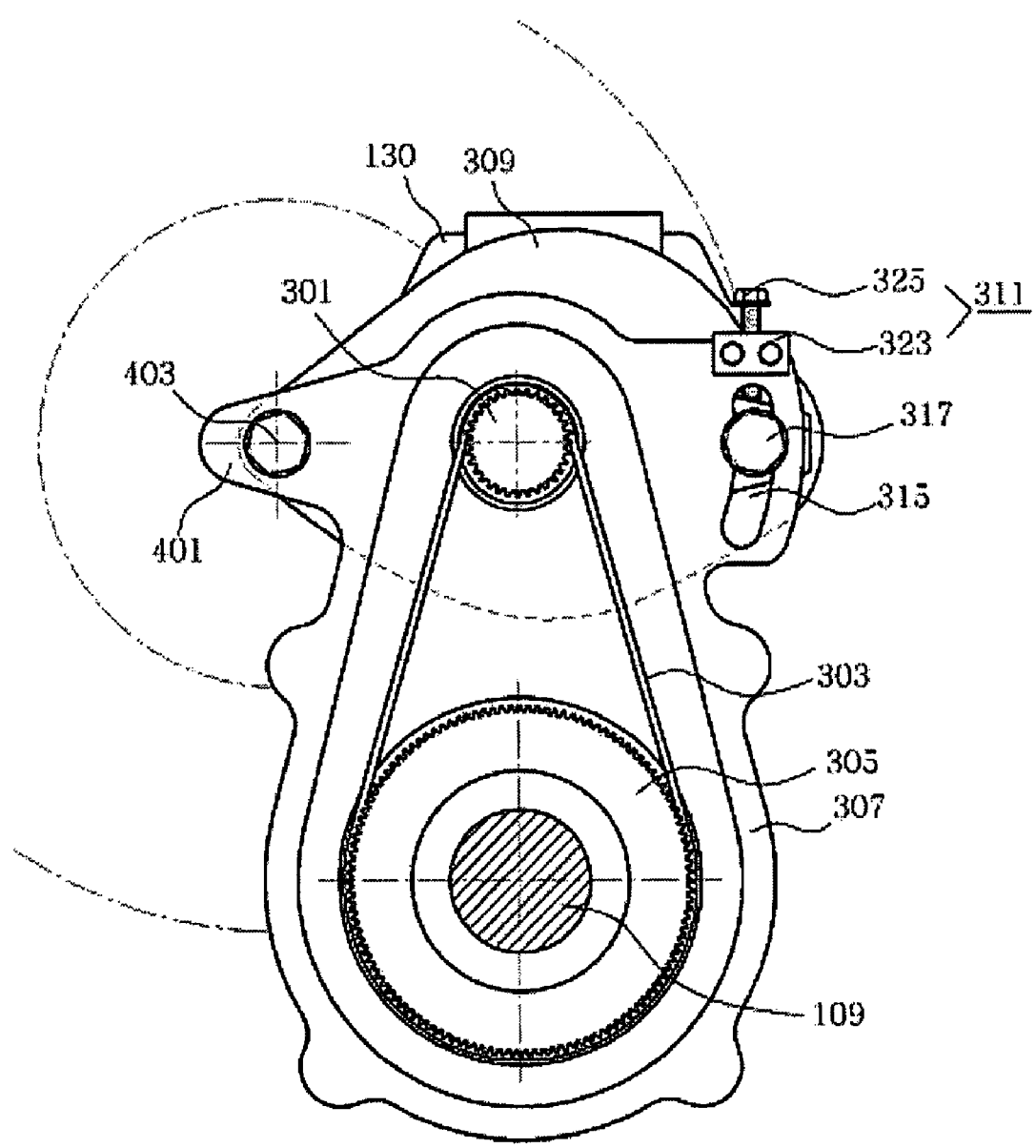
FIG. 4 is a cross-sectional view of an electric power steering apparatus according to the second embodiment of the present invention.

FIG. 4 is a cross-sectional view of an electric power steering apparatus according to the second embodiment of the present invention.

As shown in FIG. 4, in the electric power steering apparatus according to the second embodiment of the present invention, the coupling part 313 is formed in a right side of an upper part of the gear housing 307 and a hinge part 401 is formed in a left side thereof. Furthermore, a hinge shaft 403 extends through the hinge part 401 to be inserted into the motor housing 309 so that center 319 of rotation of the motor housing 309 can be equal to an axial center of the hinge shaft 403. Meanwhile, the center 319 of rotation of the motor housing 309 is equal to the center of the imaginary circle formed by imaginary extension lines of the guide holes 315 or the axial center of the hinge shaft 403.

The supporting member 323 is formed in the upper part of the coupling part 313, and the adjusting bolt 325 extends through the supporting member 313 so that an end of the adjusting bolt 325 makes contact with an outer peripheral surface of the motor housing 309.

Therefore, the adjusting bolt 325 is adjusted so that the motor housing 309 can be rotated about the hinge shaft 403 respective to the gear housing 307. Accordingly, the strength of tension of the belt 303 can be controlled.

As described above, according to the present invention, there is an advantage in that the relative rotation angle of the motor housing respective to the gear housing is adjusted so that the tension of the belt can be easily controlled and the generation of vibration and noise of the belt can be prevented.

An additional structure and functions are the same as the first embodiment of the present invention. Therefore, the same reference numerals are used to designate the same components. A detailed description of the known structure and functions herein is omitted.

Although a preferred embodiment of the present invention has been described for illustrative purposes, those skilled in the art will appreciate that various modifications, additions and substitutions are possible, without departing from the scope and spirit of the invention as disclosed in the accompanying claims. Accordingly, the scope of the invention is not to be limited by the above embodiments but by the claims and the equivalents thereof.

What is claimed is:

1. An electric power steering apparatus comprising:
   a motor for providing assistant steering power;
   a following pulley connected with the motor through a belt to receive driving force;
   a gear housing surrounding the following pulley;
   a motor housing rotatably assembled with the gear housing;
   a tension adjusting mechanism fixed to the gear housing and adjusting a rotation angle of the motor housing so as to adjust tension of the belt;
   a coupling part extending from the gear housing;
   a guide hole having a circular shape and being formed in the coupling part; and
   a coupling means extending through the guide hole to be assembled with the motor housing,
   wherein the tension adjusting mechanism includes a supporting member extending from the coupling part, and an adjusting means assembled with the supporting member while extending through the supporting member, and
   an end of the adjusting means makes contact with a side surface of the motor housing so that the motor housing is pushed by the end of the adjusting means to be rotated relative to the gear housing.

2. The electric power steering apparatus as claimed in claim 1, wherein a center of rotation of the motor housing and an axial center of a driving pulley are spaced a predetermined distance from each other.

3. The electric power steering apparatus as claimed in claim 1, wherein the coupling means is a bolt.

4. The electric power steering apparatus as claimed in claim 1, wherein the adjusting means is a bolt.

5. The electric power steering apparatus as claimed in claim 1, wherein the coupling part is formed in both sides of the gear housing.

6. The electric power steering apparatus as claimed in claim 1, further comprising a hinge part extending from the gear housing and spaced from the coupling part, and a hinge shaft extending through the hinge part to be assembled with the motor housing.

7. The electric power steering apparatus as claimed in claim 6, wherein the motor housing can rotate about the hinge shaft.

\* \* \* \* \*